United States Patent
Yue et al.

(10) Patent No.: US 11,873,448 B2
(45) Date of Patent: Jan. 16, 2024

(54) WELLBORE SERVICING FLUID AND METHODS OF MAKING AND USING SAME

(71) Applicant: Halliburton Energy Services, Inc., Houston, TX (US)

(72) Inventors: Zhiwei Yue, Houston, TX (US); Andrew Bailey Slocum, Houston, TX (US); Linping Ke, Houston, TX (US); Chunli Li, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/528,612

(22) Filed: Nov. 17, 2021

(65) Prior Publication Data
US 2023/0151267 A1     May 18, 2023

(51) Int. Cl.
| | |
|---|---|
| C09K 8/68 | (2006.01) |
| C09K 8/52 | (2006.01) |
| C09K 8/80 | (2006.01) |
| C09K 8/60 | (2006.01) |
| C09K 8/70 | (2006.01) |

(52) U.S. Cl.
CPC ............... *C09K 8/685* (2013.01); *C09K 8/52* (2013.01); *C09K 8/602* (2013.01); *C09K 8/70* (2013.01); *C09K 8/80* (2013.01)

(58) Field of Classification Search
CPC .......... C09K 8/52; C09K 8/602; C09K 8/685; C09K 8/80; Y10S 507/922; Y10S 507/927; Y10S 507/934
See application file for complete search history.

(56) References Cited

U.S. PATENT DOCUMENTS

| | | | |
|---|---|---|---|
| 5,092,404 A | 3/1992 | Falk et al. | |
| 6,911,419 B2 | 6/2005 | Lord et al. | |
| 10,392,553 B2 | 8/2019 | Shen et al. | |
| 2015/0096751 A1* | 4/2015 | Shen | C09K 8/92 507/224 |

OTHER PUBLICATIONS

"Marine Chemistry" by CRC Press LLC, 2001 (Year: 2001).*
Patterson, D. et al., "Sulfate Scale Inhibition Via Stimulation Programs Carried Out During Well Completion, Deepwater, West Africa," Corrosion Conference & Expo, 2011, 16 pages, NACE International.
Fitzgerald, Aine M. et al., "A History of Frac-Pack Scale-Inhibitor Deployment," SPE International Symposium and Exhibition on Formation Damage Control, Feb. 13-15, 2008, SPE 112474, 8 pages, Society of Petroleum Engineers International.

(Continued)

*Primary Examiner* — Aiqun Li
(74) *Attorney, Agent, or Firm* — Conley Rose, P.C.; Rodney B. Carroll

(57) ABSTRACT

Disclosed herein is a wellbore servicing fluid comprising a scale inhibitor, a surfactant, and an aqueous fluid comprising sulfate in an amount of from about 100 ppm to about 10,000 ppm based on the total weight of the aqueous fluid. The wellbore servicing fluid can be used as a fracturing fluid in a method of servicing a wellbore penetrating a subterranean formation. The wellbore servicing fluid can mitigate the formation of scales, prevent water blockage, and increase hydrocarbon production.

20 Claims, 8 Drawing Sheets

(56) References Cited

OTHER PUBLICATIONS

Graham, G.M. et al., "Selection and Application of a Non-Damaging Scale Inhibitor Package for Preemptive Squeeze in Mungo Production Wells," SPE Oilfield Scale Symposium, Jan. 30-31, 2002, SPE 74665, 16 pages, Society of Petroleum Engineers, Inc.

Marquez, M. et al., "Preemptive Scale Management: Treating with Scale Inhibitor While Frac Packing a Well," SPE Annual Technical Conference and Exhibition, Oct. 30-Nov. 2, 2011, SPE 147006, 19 pages, Society of Petroleum Engineers.

Patterson, D. et al., "Preproduction-Deployed Scale-Inhibition Treatments in Deepwater West Africa," SPE Production & Operations, Aug. 2017, SPE169784, pp. 333-342, Society of Petroleum Engineers.

Yue, Zhiwei et al., "Liquid Scale Inhibitors for Metallic-Crosslinked Gel Fracturing Systems," SPE International Oilfield Scale Conference and Exhibition, May 14-15, 2014, SPE-169806-MS, 9 pages, Society of Petroleum Engineers.

Wylde, Jonathan J. et al., "Development of a Scale Inhibitor for Zr-Crosslinked Seawater Systems: A Case History of Successful Testing to Failure and Field Applications," SPE International Oilfield Scale Conference and Exhibition, May 11-12, 2016, SPE-179881-MS, 11 pages, Society of Petroleum Engineers.

Yue, Zhiwei, et al., "Multifunctional Fracturing Additives as Flowback Aids," SPE Annual Technical Conference and Exhibition, Sep. 26-28, 2016, SPE-181383-MS, 11 pages, Society of Petroleum Engineers.

Vo, L.K. et al., "Development of Seawater-Based Fracturing Fluid for High-Temperature Wells," SPE Asia Pacific Hydraulic Fracturing Conference, Aug. 24-26, 2016, SPE-181786-MS, 12 pages, Society of Petroleum Engineers.

Alohaly, Maryam et al., "Seawater Fracturing Fluid Development Challenges: A Comparison Between Seawater-Based and Freshwater-Based Fracturing Fluids Using Two Types of Guar Gum Polymers," SPE Kingdom of Saudi Arabia Annual Technical Symposium and Exhibition, Apr. 25-28, 2016, SPE-182799-MS, 16 pages, Society of Petroleum Engineers.

Chen, Ping et al., "Developing a Polymer Scale Inhibitor for a Combined Fracture and Inhibitor Squeeze Treatment for High-Temperature Reservoirs," SPE Middle East Oil and Gas Show and Conference, Mar. 18-21, 2019, SPE-194292-MS, 11 pages, Society of Petroleum Engineers.

Almubarak, Tariq et al., "Design and Application of High-Temperature Raw-Seawater-Based Fracturing Fluids," SPE Journal, Aug. 2019, SPE 195597, pp. 1929-1946, Society of Petroleum Engineers.

Patterson, D. et al., "Sulfate Scale Inhibition Via Stimulation Programs Carried Out During Well Completion, Deepwater, West Africa," NACE International Corrosion Conference & Expo, 2011, No. 11347, 16 pages, NACE International.

\* cited by examiner

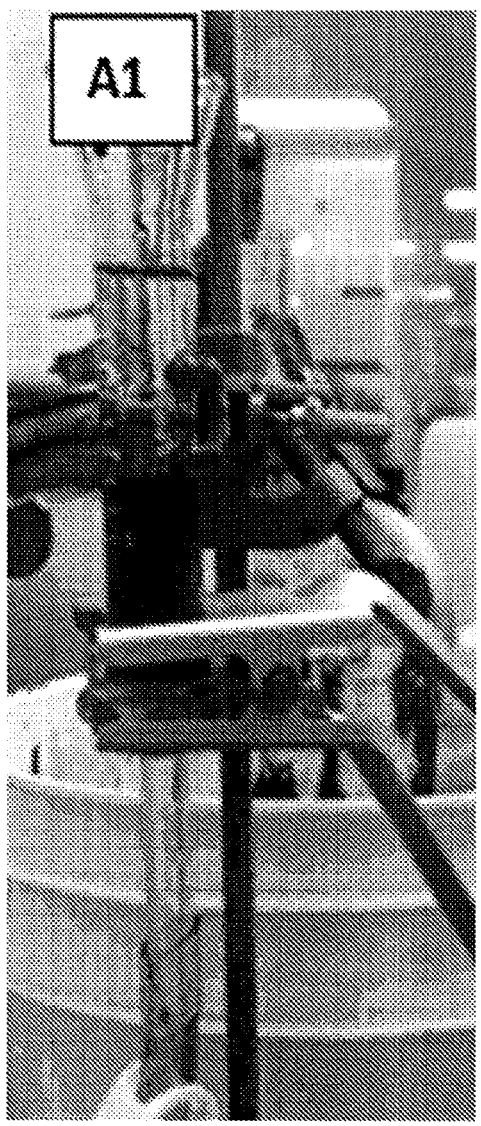 
FIG. 5A                     FIG. 5B

WELLBORE SERVICING FLUID AND METHODS OF MAKING AND USING SAME

FIELD

This application relates to a composition, and more specifically this application relates to a wellbore servicing fluid that can be used in the recovery of natural resources from a wellbore penetrating a subterranean formation.

BACKGROUND

This disclosure relates generally to a composition. More specifically, it relates to a wellbore servicing fluid and methods of making and using same for treating a wellbore penetrating a subterranean formation, for example during a fracturing operation.

Hydrocarbons, such as oil and gas, are often produced from wells that penetrate hydrocarbon-bearing subterranean formations or portions thereof. Hydrocarbon-producing wells may be stimulated by hydraulic fracturing operations, wherein proppants may be used to hold open or "prop" open fractures created during high-pressure pumping. Once the pumping-induced pressure is removed, proppants may prop open fractures in the rock formation and thus preclude the fracture from closing. As a result, the amount of formation surface area exposed to the well bore may be increased, enhancing hydrocarbon recovery rates.

Water is one of the major components in most hydraulic fracturing fluids. Fresh water can be used in a fracturing fluid, but can impose significant costs for offshore operations. Seawater-based fracturing fluids are more economical for offshore jobs as well as land treatments with limited access to fresh water, especially for single trip multi zone tool systems or multi-stage sliding sleeve wells, which can yield less emission of carbon dioxide. However, scales can form during fracturing operations due to reaction of components in a fracturing fluid and a formation composition, such as barium. Also, when a wellbore starts to produce hydrocarbons, the fracturing fluid within the wellbore is recovered to the surface (e.g., a flowback of the fracturing fluid). Residue (e.g., crosslinked gel, scale) of the fracturing fluid in the wellbore can potentially lead to water blockage and restricted hydrocarbon productivity.

Therefore, an ongoing need exists for a wellbore servicing fluid that can be prepared with sea water and has reduced residues when being recovered.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIGS. 5A and 5B are photos of samples and apparatus after a sand pack oil displacement test in accordance with some aspects of the disclosure.

DETAILED DESCRIPTION

Figure 1:
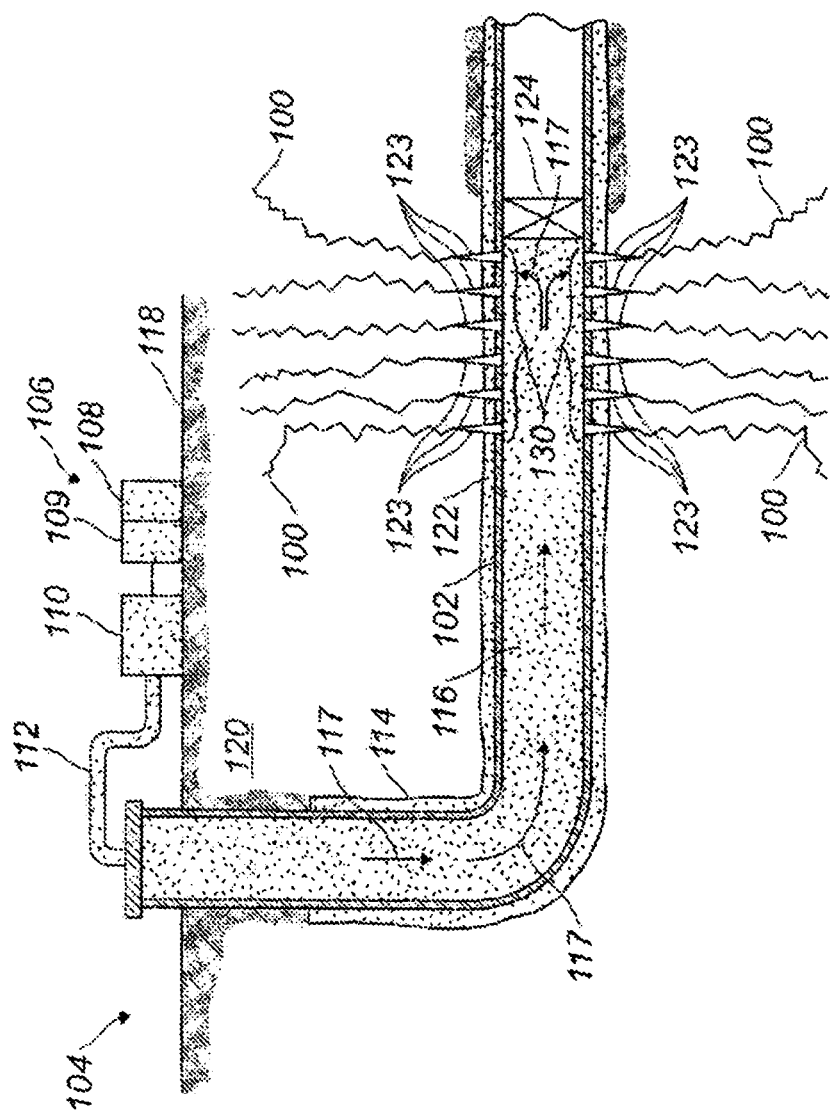
FIG. 1 is a schematic view of an example well system utilized for hydraulic fracturing.

It should be understood at the outset that although an illustrative implementation of one or more aspects are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein is a wellbore servicing fluid including a scale inhibitor, a surfactant, and an aqueous fluid. In aspects, the aqueous fluid includes sulfate in an amount of from about 100 ppm to about 10,000 ppm based on the total weight of the aqueous fluid. Alternatively, the sulfate can be present in the aqueous fluid in an amount of from about 100 ppm to about 7,000 ppm based on the total weight of the aqueous fluid, alternatively from about 200 ppm to about 6,000 ppm, alternatively from about 500 ppm to about 4,000 ppm, alternatively from about 500 ppm to about 3,000 ppm, or alternatively from about 1,000 ppm to about 3,000 ppm.

In aspects, the wellbore servicing fluid includes a scale inhibitor. The scale inhibitor can be any suitable scale inhibitor that is compatible with the surfactant and other components in the wellbore servicing fluid. In aspects, the scale inhibitor includes a polymeric scale inhibitor, phosphate esters, phosphonates, bis(hexamethylene triamine penta (methylene phosphonic acid)), diethylene triamine penta (methylene phosphonic acid), ethylene diamine tetra (methylene phosphonic acid), hexamethylenediamine tetra (methylene phosphonic acid), 1-hydroxy ethylidene-1,1-diphosphonic acid, 2-hydroxyphosphonocarboxylic acid, 2-phosphonobutane-1,2,4-tricarboxylic acid, phosphino carboxylic acid, diglycol amine phosphonate, aminotris(methanephosphonic acid), methylene phosphonates, phosphonic acids, aminoalkylene phosphonic acids, aminoalkyl phosphonic acids, or combinations thereof.

In some aspects, the polymeric scale inhibitor includes polyphosphates and salts thereof; polyvinyl sulfonates; polyacrylamidomethylpropane sulfonic acid; carboxymethyl inulin; other carboxylic acid containing polymers; sulfonated acrylate polymers or copolymers; acrylic acid polymers or copolymers, and salts thereof; sulfonated acrylic acid polymers or copolymers, and salts thereof; or combinations thereof. In aspects, the polymeric scale inhibitor includes a sulfonated polyacrylate copolymer.

The polymeric scale inhibitor can have a number average molecular weight from about 500 Daltons (Da) to about 100,000 Da, alternatively from about 1,000 Da to about 50,000 Da, or alternatively from about 5,000 Da to about 50,000 Da.

Examples of suitable scale inhibitors commercially available from Halliburton Energy Services, Inc., Duncan, Okla., include SCALE CHECK SCP-2™ scale inhibitor, SCALE-CHECK HT™ scale inhibitor, and SCALECHECK LP-55™ scale inhibitor. An example of a suitable phosphonate ester scale inhibitor includes DEQUEST® phosphonates, available from Solutia Corp., Springfield, Mass.

In some aspects, the scale inhibitor is present in the wellbore servicing fluid in an amount of from about 0.05 gallon per thousand gallons of the wellbore servicing fluid (gpt) to about 200 gpt, based on the total volume of the wellbore servicing fluid, alternatively from about 0.05 gpt to about 180 gpt, or alternatively from about 5 gpt to about 160 gpt.

In aspects, the wellbore servicing fluid includes a surfactant. The surfactant can include a cationic surfactant, an anionic surfactant, an amphoteric surfactant, a zwitterionic surfactant, a non-ionic surfactant, or combinations thereof. Surfactants in general are wetting agents that lower the surface tension of a liquid in which they are dissolved, allowing easier spreading and decreasing the interfacial tension between two liquids. Each surfactant has a hydrophilic head that is attracted to water molecules and a hydrophobic tail that repels water and attaches itself to hydrophobic materials such as oil and grease.

In some aspects, the surfactant includes a zwitterionic surfactant. Zwitterionic surfactants are electrically neutral surfactants that carry both a formal positive and a formal negative charge on different atoms in the same molecule. Such surfactants are characterized by a relatively high solubility in water, relatively low solubility in organic solvents, and increased stability at higher temperatures when compared to other types of surfactants (e.g., non-ionic surfactants).

In an aspect, the zwitterionic surfactant includes alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, or combinations thereof In an aspect, the zwitterionic surfactant includes an amine oxide. Amine oxides, also termed amine N-oxides or N-oxides, are chemical compounds that include the functional group $R_3N^+$—O— where R may be an alkyl moiety having from 1 to 20 carbon atoms. The term amine oxide herein is meant to include oxides of tertiary amines including nitrogen containing aromatic compounds, analogous primary or secondary amines, derivatives thereof, or combinations thereof. Examples of amine oxides suitable for use in this disclosure include without limitation decylamine oxide, dodecylamine oxide, tetradecylamine oxide, or combinations thereof.

In an aspect, the zwitterionic surfactant includes a betaine. Betaines are neutral chemical compounds including a positively charged cationic functional group and no hydrogen atom and a negatively charged functional group that may not be adjacent to the cationic site. For example, a betaine may include an onium ion (e.g., ammonium, phosphonium) and a carboxylate group. Examples of betaines suitable for use in this disclosure include without limitation laurylamidopropyl betaine, decyl betaine, dodecyl betaine, or combinations thereof.

In an aspect, the zwitterionic surfactant includes a phospholipid. Phospholipids are similar in structure to tri-glycerides with the exception that the first hydroxyl of the glycerine molecule has a polar phosphate containing group in place of the fatty acid. The hydrocarbon chain of the phospholipid is hydrophobic while the charges on the phosphate groups make that portion of the molecule hydrophilic resulting in an amphiphilic molecule. Examples of phospholipids suitable for use in this disclosure include without limitation lecithin, phosphatidyl choline, derivatives thereof, or combinations thereof.

In some aspects, the surfactant includes a cationic surfactant. Herein a cationic surfactant has a positively charged head and a hydrophobic tail including a carbon chain. A cationic surfactant suitable for use in this disclosure may have a carbon chain having a length of from about 8 to about 24, alternatively from about 8 to about 18, alternatively from about 12 to about 22, alternatively from about 16 to about 24. In some aspects, the cationic surfactant includes quaternary ammonium salt, ethoxylated quaternary ammonium salts, amine oxides, or combinations thereof. In an aspect, the cationic surfactant includes stearyltrimethylammonium chloride, cetyltrimethylammonium tosylate, octyltrimethylammonium chloride, erucyl bis-(hydroxyethyl)methylammonium chloride, erucyl trimethylammonium chloride, cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, or combinations thereof.

In some aspects, the surfactant includes an anionic surfactant. Herein an anionic surfactant has a negatively charged head and a hydrophobic tail including a carbon chain. An anionic surfactant suitable for use in this disclosure may have carbon chain having a length of from about 8 to about 24, alternatively from about 8 to about 18, alternatively from about 12 to about 22, alternatively from about 18 to about 24. Examples of anionic surfactants suitable for use in this disclosure include without limitation alkali salts of acids, alkali salts of fatty acids, alkaline salts of acids, sodium salts of acid, sodium salts of fatty acid, alkyl sulphates, alkyl ethoxylate, sulphates, sulfonates, soaps, or a combination thereof. In aspects, the anionic surfactant includes sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, or a combination thereof.

In some aspects, the surfactant includes a non-ionic surfactant. Herein a non-ionic surfactant has an uncharged hydrophilic head and a hydrophobic tail including a carbon chain. A non-ionic surfactant suitable for use in this disclosure may have carbon chain having a length of from about 8 to about 24, alternatively from about 8 to about 18, alternatively from about 12 to about 22, alternatively from about 18 to about 24. Examples of non-ionic surfactants suitable for use in this disclosure include without limitation linear alcohol ethoxylates, polyoxvethylene alkylphenol ethoxylates, polyoxyethylene alcohol ethoxylates, polyoxyethylene esters of fatty acids, polyoxyethylene mercaptans, polyoxyethylene alkylamines, polyol ester surfactants, or a combination thereof.

In some aspects, the surfactant is present in the wellbore servicing fluid in an amount of from about 0.01 gpt to about 10 gpt, based on the total volume of the wellbore servicing fluid, alternatively from about 0.05 gpt to about 9 gpt, or alternatively from about 0.1 gpt to about 8 gpt.

The wellbore servicing fluid can include an aqueous fluid having sulfate in an amount of from about 100 ppm to about 10,000 ppm based on the total weight of the aqueous fluid. Generally, the aqueous fluid may be from any source, provided that it does not contain an amount of components that may undesirably affect the other components in the wellbore servicing fluid. For example, the aqueous fluid can be selected from a group including essentially of fresh water, surface water, ground water, produced water, salt water, sea water, brine (e.g., underground natural brine, formulated brine, etc.), and combinations thereof. A formulated brine may be produced by dissolving one or more soluble salts in water, a natural brine, or sea water. Representative soluble salts include the chloride, bromide, acetate, and formate salts of potassium, sodium, calcium, magnesium, and zinc. The aqueous fluid can be present in the wellbore servicing fluid in an amount effective to provide a slurry having desired (e.g., job or service specific) rheological properties. In aspects, the aqueous fluid includes sea water. In aspects, the aqueous fluid is present in the wellbore servicing fluid in an amount of from about 5 wt. % to about 99 wt. % based on the total weight of the wellbore servicing fluid, alternatively from about 10 wt. % to about 97 wt. %, or alternatively from about 15 wt. % to about 95 wt. %.

In aspects, the wellbore servicing fluid further includes a gelling agent. The gelling agent may be naturally-occurring, synthetic, or a combination thereof. The gelling agent can include hydratable polymers that contain one or more functional groups such as hydroxyl, cis-hydroxyl, carboxyl, sulfate, sulfonate, phosphate, phosphonate, amino, or amide groups. The gelling agent may include locust bean gum, Karaya gum, gum tragacanth, hydrophobically modified guars, high-molecular weight polysaccharides composed of mannose and galactose sugars, heteropolysaccharides obtained by the fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, or combinations thereof.

In aspects, the gelling agent has a molecular weight in a range of from about 1.2 MM Daltons (Da) to about 5 MM Da, alternatively from about 1.2 MM Da to about 4.5 MM Da, or alternatively from about 1.5 MM Da to about 4.5 MM Da. The gelling agent can be in the wellbore servicing fluid in an amount ranging from about 0.5 lbs/1,000 gal of the wellbore servicing fluid to about 200 lbs/1,000 gal. Alternatively, in an amount ranging from about 0.5 lbs/1,000 gal to about 5 lbs/1,000 gal, in an amount ranging from about 5 lbs/1,000 gal to about 10 lbs/1,000 gal, in an amount ranging from about 10 lbs/1,000 gal to about 15 lb/1,000 gal, in an amount ranging from about 15 lb/1,000 gal to about 60 lb/1,000 gal, in an amount ranging from about 60 lb/1,000 gal to about 200 lb/1,000 gal, or alternatively, an amount ranging between any of the previously recited ranges.

The gelling agent can be in the wellbore servicing fluid in an amount of from about 0.001 wt. % to about 3 wt. %, based on the total weight of the wellbore servicing fluid, alternatively from about 0.01 wt. % to about 2 wt. %, or alternatively from about 0.1 wt. % to about 1 wt. %.

In aspects, the wellbore servicing fluid further includes a crosslinker. In an aspect, the crosslinker includes a boron containing compound. In an aspect, the crosslinker includes a boric acid, boric oxide, pyroboric acid, metaboric acid, borax, sodium tetraborate and like, or combinations thereof.

In aspects, the crosslinker is in the wellbore servicing fluid in an amount of from about 0 gpt to about 20 gpt, based on the total volume of the wellbore servicing fluid, alternatively from about 0 gpt to about 12 gpt, or alternatively from about 0 gpt to about 7 gpt.

The gelling agent can crosslink with the crosslinker to form a crosslinked system. Crosslinking refers to a procedure to connect units between neighboring chains of atoms in a complex chemical molecule (e.g., a polymer, a biopolymer such as a starch) and/or between molecules. The connecting can be in the form of any bond, for example, covalent bond, ionic bond, and the like. In one or more aspects, the gelling agent is at least partially crosslinked, wherein at least a portion of the molecules of the gelling agent are crosslinked by a reaction including the crosslinker. In an aspect, the crosslinked system formed in the wellbore servicing fluid of the present disclosure increases the wellbore servicing fluid's viscosity which may be desired for some types of subterranean applications. For example, an increase in viscosity may be used for transferring hydraulic pressure to divert wellbore servicing fluids to another part of a formation or for preventing undesired leak-off of fluids into a formation from the buildup of filter cakes. The wellbore servicing fluid with the crosslinked system can also be described as a "gelled" or a "crosslinked" wellbore servicing fluid. The increased viscosity of the crosslinked wellbore servicing fluid, among other things, may reduce fluid loss and may allow the wellbore servicing fluid to transport significant quantities of suspended proppant. In aspects, the crosslinked system further includes at least a portion of the scale inhibitor. The scale inhibitor can crosslink with the other parts in the crosslinked system (e.g., the gelling agent, the crosslinker). In some aspects, at least a portion of the scale inhibitor is not included in the crosslinked system.

In aspects, the wellbore servicing fluid further includes proppants. The proppants can include a variety of solid particles, including, but not limited to, sand, bauxite, ceramic materials, glass materials, polymer materials, polytetrafluoroethylene materials, nutshell pieces, cured resinous particulates including nutshell pieces, seed shell pieces, cured resinous particulates including seed shell pieces, fruit pit pieces, cured resinous particulates including fruit pit pieces, wood, composite particulates, and combinations thereof. Suitable composite particulates may include a binder and a filler material. The filler materials can include silica, alumina, fumed carbon, carbon black, graphite, mica, titanium dioxide, meta-silicate, calcium silicate, kaolin, talc, zirconia, boron, fly ash, hollow glass microspheres, solid glass, or combinations thereof. The proppants can have any suitable particle size for a particular application such as, without limitation, nano particle size, micron particle size, or any combinations thereof. As used herein, the term particle size refers to a d50 particle size distribution, wherein the d50 particle size distribution is the value of the particle diameter at 50% in the cumulative distribution. The d50 particle size distribution may be measured by particle size analyzers such as those manufactured by Malvern Instruments, Worcestershire, United Kingdom. As used herein, nano-size is understood to mean any proppant with a d50 particle size distribution of less than 1 micron. For example, a proppant with a d50 particle size distribution at point ranging from about 10 nanometers to about 1 micron. Alternatively, a proppant with a d50 particle size distribution at point ranging from about 10 nanometers to about 100 nanometers, a proppant with a d50 particle size distribution at point ranging from about 100 nanometers to about 300 nanometers, a proppant with a d50 particle size distribution at point ranging from about 300 nanometers to about 700 nanometers, a proppant with a d50 particle size distribution at point ranging from about 700 nanometers to about 1 micron, or a proppant with a d50 particle size distribution between any of the previously recited ranges. As used herein, micron-size is understood to mean any proppant with a d50 particle size distribution at a point ranging from about 1 micron to about 1000 microns. Alternatively, a proppant with a d50 particle size distribution at point ranging from about 1 micron to about 100 microns, a proppant with a d50 particle size distribution at point ranging from about 100 microns to about 300 microns, a proppant with a d50 particle size distribution at point ranging from about 300 microns to about 700 micron, a proppant with a d50 particle size distribution at point ranging from about 700 microns to about 1000 microns, or a proppant with a d50 particle size distribution between any of the previously recited ranges.

Alternatively, proppant particle sizes may be expressed in U.S. mesh sizes such as, for example, 20/40 mesh (212 μm-420 μm). The proppants expressed in U.S. mesh sizes may include proppants with particle sizes at a point ranging from about 8 mesh to about 140 mesh (106 μm-2.36 mm). Alternatively, a point ranging from about 16-30 mesh (600 μm-1180 μm), a point ranging from about 20-40 mesh (420 μm-840 μm), a point ranging from about 30-50 mesh (300 μm-600 μm), a point ranging from about 40-70 mesh (212 μm-420 μm), a point ranging from about 70-140 mesh (106 μm-212 μm), or alternatively any range there between. The standards and procedures for measuring a particle size or particle size distribution may be found in ISO 13503, or, alternatively in API RP 56, API RP 58, API RP 60, or any combinations thereof.

The proppants can have any suitable density. In some aspects, the proppants have a density at a point ranging from about 1.25 g/cm$^3$ to about 10 g/cm$^3$. The proppants can include any shape, including but not limited, to spherical, toroidal, amorphous, planar, cubic, or cylindrical. The proppants can further include any roundness and sphericity. The proppant can be present in the wellbore servicing fluid in any concentration or loading. Without limitation, the proppants can be present a point ranging from about 0 pounds per gallon ("lb/gal") (0 kg/m$^3$) to about 20 lb/gal (2396.5 kg/m$^3$). Alternatively, a point ranging from about 0 lb/gal (0 kg/m$^3$) to about 0.1 lb/gal (12 kg/m$^3$), a point ranging from about 0.1 lb/gal (12 kg/m$^3$) to about 1 lb/gal (119.8 kg/m$^3$), a point ranging from about 1 lb/gal (119.8 kg/m$^3$) to about 3 lb/gal (359.4 kg/m$^3$), a point ranging from about 3 lb/gal (359.4 kg/m$^3$) to about 6 lb/gal (718.8 kg/m$^3$), a point ranging from about 6 lb/gal (718.8 kg/m$^3$) to about 9 lb/gal (1078.2 kg/m$^3$), a point ranging from about 9 lb/gal (1078.2 kg/m$^3$) to about 12 lb/gal (1437.6 kg/m$^3$), a point ranging from about 12 lb/gal (1437.6 kg/m$^3$) to about 14 lb/gal (1677.2 kg/m$^3$), a point ranging from about 14 lb/gal (1677.2 kg/m$^3$) to about 20 lb/gal (2396.5 kg/m$^3$), or alternatively, any range therebetween.

In aspects, the wellbore servicing fluid further includes one or more additives. The one or more additives can include a friction reducer, a strength-stabilizing agent, an emulsifier, an expansion agent, a salt, a fluid loss agent, a vitrified shale, a thixotropic agent, a dispersing agent, a weight reducing additive (e.g., hollow glass or ceramic beads), a heavyweight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives (i.e. carbon fibers, glass fibers, metal fibers, minerals fibers, polymeric elastomers, latexes, etc.), inert particulates, a biopolymer, a polymer, a fume silica, a free fluid control additive, particulate materials, viscosifiers, acids, bases, mutual solvents, corrosion inhibitors, conventional breaking agents, relative permeability modifiers, lime, weight-reducing agents, clay control agents, fluid loss control additives, flocculants, water softeners, foaming agents, oxidation inhibitors, thinners, scavengers, gas scavengers, lubricants, bridging agents, a foam stabilizer, catalysts, dispersants, breakers, emulsion thinner, emulsion thickener, pH control additive, lost circulation additives, buffers, stabilizers, chelating agents, oxidizers, a clay, reducers, consolidating agent, complexing agent, sequestration agent, control agent, an oxidative breaker, and the like, or combinations thereof. The oxidative breaker can include bromate, persulfate, perborate, and perbromate, for example. With the benefit of this disclosure, one of ordinary skill in the art should be able to recognize and select one or more suitable optional additives for use in the wellbore servicing fluid.

The one or more additives can be present in the wellbore servicing fluid in any suitable amounts. In aspects, the one or more additives are present in the wellbore servicing fluid in an amount of from about 0.01 wt. % to about 80 wt. %, based on the total weight of the wellbore servicing fluid, alternatively from about 0.1 wt. % to about 80 wt. %, or alternatively from about 1 wt. % to about 70 wt. %.

The wellbore servicing fluid disclosed herein can have any suitable viscosity. In aspects, the wellbore servicing fluid has a viscosity in a range of from about 1 cp to about 7,500 cp at about 40 s$^{-1}$ and about 34° F. to about 450° F., alternatively from about 5 cp to about 5,000 cp, alternatively from about 8 cp to about 3,500 cp, or alternatively from about 10 cp to about 1,500 cp, which can be measured by a Rheometer (e.g., from Anton Paar GmbH or Chandler Engineering Rhemometer).

The wellbore servicing fluid disclosed herein can have any suitable density, including, but not limited to, in a range of from about 5 lb/gal (ppg) to about 20 ppg, alternatively from about 7 ppg to about 20 ppg, alternatively from about 10 ppg to about 20 ppg, or alternatively from about 12 ppg to about 18 ppg.

The wellbore servicing fluid disclosed herein can have an oil breakthrough time of equal to or less than about 120 min in a sand pack oil displacement test (as described in detail in Example 2), alternatively equal to or less than about 60 min, alternatively equal to or less than about 30 min, alternatively equal to or less than about 5 min, alternatively equal to or less than about 4 min, or alternatively equal to or less than about 3.5 min. In a sand pack oil displacement test, a sand pack including about 10 grams of rock cutting and sand is treated by the wellbore servicing fluid, and then 5 mL to 10 mL oil is placed on top of the treated sand pack and allowed to flow through the treated sand pack. A constant overhead pressure can be maintained above the sand pack by keeping the oil level unchanged during the sand pack oil displacement test. When the first drop of the oil flows through the sand pack, the time is recorded as the oil breakthrough time and the sand pack oil displacement test is ended. The wellbore servicing fluid that is displaced from the treated sand pack is collected at the bottom of the treated sand pack and its volume is defined as the displacement volume.

The wellbore servicing fluid can have a displacement volume of from about 0.5 mL to about 10 mL in a sand pack oil displacement test, alternatively from about 0.5 mL to about 8 mL, or alternatively from about 3 mL to about 6 mL.

A wellbore servicing fluid of the type disclosed herein can be prepared using any suitable method. In aspects, the method includes mixing components (e.g., a scale inhibitor, a surfactant, an aqueous fluid) of the wellbore servicing fluid using mixing equipment (e.g., a jet mixer, re-circulating mixer, a batch mixer, a blender, a mixing head of a solid feeding system) to form a pumpable slurry (e.g., a homogeneous fluid). Any container(s) that is compatible with the components and has sufficient space can be used for mixing.

In aspects, mixing the components of the composition can be on-the-fly (e.g., in real time or on-location). In some aspects, the mixing equipment may be disposed on one or more trucks as will be apparent to those of ordinary skill in the art. In some aspects, a jet mixer may be used, for example, to continuously mix components of the wellbore servicing fluid (e.g., a scale inhibitor, a surfactant, an aqueous fluid) as it is being pumped to the wellbore. In aspects, a re-circulating mixer and/or a batch mixer may be used to mix a first group of components of the wellbore servicing fluid (e.g., a scale inhibitor, a surfactant, and an aqueous fluid), and a second group of components of the wellbore servicing fluid (e.g., proppants, one or more additives) may be added to the mixer prior to pumping the wellbore servicing fluid downhole. Additionally, batch mixer type units for the first group of components may be plumbed in line with a separate tank containing the second group of components. The second group of components may then be fed in-line with the first group of components as it is pumped out of the mixing unit.

The wellbore servicing fluid can be prepared at a wellsite or remote from a wellsite. For example, some components of the wellbore servicing fluid (e.g., a scale inhibitor, a surfactant) can be transported to the wellsite and combined (e.g., mixed/blended) with an aqueous fluid located proximate the wellsite to form the wellbore servicing fluid. The aqueous fluid can be conveyed from a source (e.g., sea) to the wellsite or be available at the wellsite prior to the combining. Some components can be prepared at a location remote from the wellsite and transported to the wellsite, and, if necessary, stored at the on-site location. When it is desirable to prepare the wellbore servicing fluid at the wellsite, the components along with additional aqueous fluid and optional other additives can be mixed to form a mixture (e.g. in a blender tub, for example mounted on a trailer).

The method disclosed herein can further include placing the wellbore servicing fluid into a wellbore penetrating at least a portion of a subterranean formation, wherein the wellbore servicing fluid contacts barium present in the subterranean formation (e.g., in formation water). In aspects, placing the wellbore servicing fluid into the subterranean formation uses one or more pumps.

A wellbore servicing fluid of the type disclosed herein can be used as a fracturing fluid. In fracturing operations, the wellbore servicing fluid can be placed (e.g., pumped) at high-pressure into a wellbore. The wellbore servicing fluid may then be introduced into a portion of a subterranean formation at a pressure sufficient to create or enhance at least one fracture in the subterranean formation. In some aspects, the wellbore servicing fluid is introduced at a sufficient pressure and velocity to cut a casing and/or create perforation tunnels and fractures within the subterranean formation. The wellbore servicing fluid can be squeezed into porosity of the perforation tunnels and fractures in the subterranean formation.

The wellbore servicing fluid can contact with barium present in the subterranean formation. In an aspect, the barium is dissolved in a formation fluid (e.g., formation water) in the subterranean formation. In an aspect, the barium is in a solid form in the subterranean formation, and after contacting with the wellbore servicing fluid, the barium can dissolve in the wellbore servicing fluid. The wellbore servicing fluid can inhibit formation of scales (e.g., barium sulfate precipitates) within the wellbore, such as in the subterranean formation and in equipment (e.g., pipes, valves, pumps) within the wellbore. Proppants can be included in the wellbore servicing fluid to keep the fractures open so that hydrocarbons may be produced from the subterranean formation and flow into the wellbore. At least one proppant can be deposited in the at least one fracture. Hydraulic fracturing may create high-conductivity fluid communication between the wellbore and the subterranean formation.

After the fracturing operation, at least a portion of the wellbore servicing fluid can be recovered (e.g., flown back) to a surface (e.g., a wellsite) of the wellbore. Flowing back the wellbore servicing fluid can use any suitable method and equipment, such as pumps and pipes. Combination of the scale inhibitor and the surfactant disclosed herein can operate as a flowback aid, which enhances the flowing back rate of the wellbore servicing fluid. Any suitable amounts of the wellbore servicing fluid can be recovered. In some aspects, at least 10%, 20%, 30%, 40%, 50%, 60%, 70%, 80%, or 90% of the wellbore servicing fluid is recovered. In aspects, the hydrocarbons are then produced from the subterranean formation via the wellbore. Usually, the hydrocarbons displace residues of water in the wellbore. Residues of water in the wellbore can be from wellbore servicing fluids or water produced from the subterranean formation and may cause water blockage, which can reduce permeability of hydrocarbons in the subterranean formation and hydrocarbon production from the wellbore. However, the wellbore servicing fluid of the type disclosed herein can mitigate the water blockage, thus increase the hydrocarbon production from the wellbore.

In an aspect, the wellbore is offshore. The aqueous fluid included in the wellbore servicing fluid can be sea water. In aspects, the wellbore has a Bottomhole Static Temperature (BHST) of from about 50° F. to about 450° F., alternatively from about 50° F. to about 400° F., alternatively from about 50° F. to about 350° F., alternatively from about 50° F. to about 300° F., alternatively from about 50° F. to about 250° F., or alternatively from about 50° F. to about 200° F.

FIG. 1 illustrates an example of a well system 104 that may be used to introduce a fracturing fluid 117, which can be a wellbore servicing fluid of the type disclosed herein into fractures 100. Well system 104 may include a fluid handling system 106, which may include fluid supply 108, mixing equipment 109, pumping equipment 110, and wellbore supply conduit 112. Pumping equipment 110 may be fluidly coupled with the fluid supply 108 and wellbore supply conduit 112 to communicate a fracturing fluid 117, which may include proppant 116 into wellbore 114. Proppant 116 may be any of the proppants described herein. The fluid supply 108 and pumping equipment 110 may be above the surface 118 while the wellbore 114 is below the surface 118.

Well system 104 may also be used for the pumping of a pad or pre-pad fluid into the subterranean formation at a pumping rate and pressure at or above the fracture gradient of the subterranean formation to create and maintain at least one fracture 100 in subterranean formation 120. The pad or pre-pad fluid may be substantially free of solid particles such as proppant, for example, less than 1 wt. % by weight of the pad or pre-pad fluid. The pad or pre-pad fluid can be a wellbore servicing fluid of the type disclosed herein. Well system 104 may then pump the fracturing fluid 117, which can be a wellbore servicing fluid of the type disclosed herein, into subterranean formation 120 surrounding the wellbore 114. Generally, a wellbore 114 may include horizontal, vertical, slanted, curved, and other types of wellbore geometries and orientations, and the proppant 116 may generally be applied to subterranean formation 120 surrounding any portion of wellbore 114, including fractures 100. The wellbore 114 may include the casing 102 that may be cemented (or otherwise secured) to the wall of the wellbore 114 by cement sheath 122. Perforations 123 may allow communication between the wellbore 114 and the subterranean formation 120. As illustrated, perforations 123 may penetrate casing 102 and cement sheath 122 allowing communication between interior of casing 102 and fractures 100. A plug 124, which may be any type of plug for oilfield applications (e.g., bridge plug), may be disposed in wellbore 114 below the perforations 123.

In accordance with systems and/or methods of the present disclosure, a perforated interval of interest 130 (depth interval of wellbore 114 including perforations 123) may be isolated with plug 124. A pad or pre-pad fluid may be pumped into the subterranean formation 120 at a pumping rate and pressure at or above the fracture gradient to create and maintain at least one fracture 100 in subterranean formation 120. Then, proppant 116 may be mixed with an aqueous fluid and other components via mixing equipment 109, thereby forming a fracturing fluid 117 of the type disclosed herein, and then may be pumped via pumping equipment 110 from fluid supply 108 down the interior of casing 102 and into subterranean formation 120 at or above a fracture gradient of the subterranean formation 120. Pumping the fracturing fluid 117 at or above the fracture gradient of the subterranean formation 120 may create (or enhance) at least one fracture (e.g., fractures 100) extending from the perforations 123 into the subterranean formation 120. Alternatively, the fracturing fluid 117 may be pumped down production tubing, coiled tubing, or a combination of coiled tubing and annulus between the coiled tubing and the casing 102.

At least a portion of the fracturing fluid 117 may enter the fractures 100 of subterranean formation 120 surrounding wellbore 114 by way of perforations 123. Perforations 123 may extend from the interior of casing 102, through cement sheath 122, and into subterranean formation 120.

Figure 2:
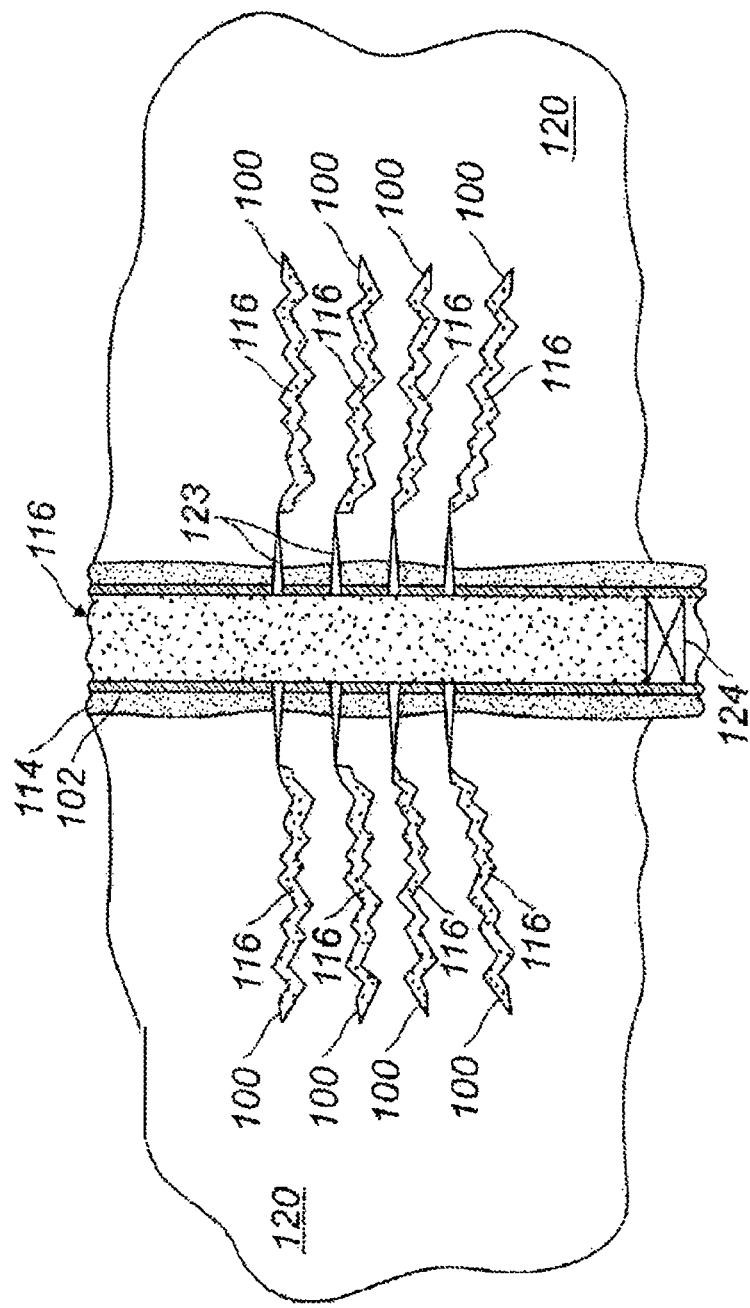
FIG. 2 is a schematic view of an example of a wellbore after introduction of a fracturing fluid.

Referring to FIG. 2, the wellbore 114 is shown after placement of the proppant 116 in accordance with systems and/or methods of the present disclosure. Proppant 116 may be positioned within fractures 100, thereby propping open fractures 100.

The pumping equipment 110 may include a high pressure pump. As used herein, the term "high pressure pump" refers to a pump that is capable of delivering the fracturing fluid 117 and/or pad/pre-pad fluid downhole at a pressure of about 1000 psi (6894 kPa) or greater. A high pressure pump may be used when it is desired to introduce the fracturing fluid 117 and/or pad/pre-pad fluid into subterranean formation 120 at or above a fracture gradient of the subterranean formation 120, but it may also be used in cases where fracturing is not desired. Additionally, the high pressure pump may be capable of fluidly conveying particulate matter, such as the proppant 116, into the subterranean formation 120. Suitable high pressure pumps may include, but are not limited to, floating piston pumps and positive displacement pumps. Without limitation, the initial pumping rates of the pad fluid, pre-pad fluid and/or fracturing fluid 117 may range from about 6 barrels per minute ("bbl/min") (954 l/min) to about 120 bbl/min (19079 l/min), enough to effectively create a fracture into the formation and place the proppant 116 into at least one fracture 101.

Alternatively, the pumping equipment 110 may include a low pressure pump. As used herein, the term "low pressure pump" refers to a pump that operates at a pressure of about 1000 psi (6894 kPa) or less. A low pressure pump may be fluidly coupled to a high pressure pump that may be fluidly coupled to a tubular (e.g., wellbore supply conduit 112). The low pressure pump may be configured to convey the fracturing fluid 117 and/or pad/pre-pad fluid to the high pressure pump. The low pressure pump may "step up" the pressure of the fracturing fluid 117 and/or pad/pre-pad fluid before it reaches the high pressure pump.

Mixing equipment 109 may include a mixing tank that is upstream of the pumping equipment 110 and in which the wellbore servicing fluid (e.g., fracturing fluid 117, pad or pre-pad fluid) may be formulated. The pumping equipment 110 (e.g., a low pressure pump, a high pressure pump, or a combination thereof) may convey the wellbore servicing fluid from the mixing equipment 109 or other source of the wellbore servicing fluid to the casing 102. Alternatively, the wellbore servicing fluid may be formulated offsite and transported to a worksite, in which case the wellbore servicing fluid may be introduced to the casing 102 via the pumping equipment 110 directly from its shipping container (e.g., a truck, a railcar, a barge, or the like) or from a transport pipeline. In either case, the wellbore servicing fluid may be drawn into the pumping equipment 110, elevated to an appropriate pressure, and then introduced into the casing 102 for delivery downhole.

A hydraulic fracturing operation may operate in stages where a bridge plug, frac plug, or other obstruction is inserted into the wellbore to prevent fluid communication with a region of the wellbore after the bridge plug. A perforating gun including explosive shaped charges may be inserted into a region of the wellbore before the bridge plug (i.e. a region where the measured depth is less than the measured depth of the bridge plug) and perforate holes through the walls of the wellbore. The perforating gun may be removed from the wellbore and a fracturing fluid introduced thereafter. The stage is completed when the planned volume of fluid and proppant has been introduced into the subterranean formation. Another stage may begin with the insertion of a second bridge plug into a wellbore region before the bridge plug.

After the hydraulic fracturing operation, at least a portion of the wellbore servicing fluid can be recovered (e.g., flown back) to the surface 118 of the wellbore. And hydrocarbons can be produced from the subterranean formation via the wellbore.

The exemplary wellbore servicing fluids disclosed herein may directly or indirectly affect one or more components or pieces of equipment associated with the preparation, delivery, recapture, recycling, reuse, and/or disposal of the disclosed wellbore servicing fluids. For example, the disclosed wellbore servicing fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary wellbore servicing fluids. The disclosed wellbore servicing fluids may also directly or indirectly affect any transport or delivery equipment used to convey the wellbore servicing fluids to a well site or downhole such as, for example, any transport vessels, conduits, pipelines, trucks, tubulars, and/or pipes used to compositionally move the wellbore servicing fluids from one location to another, any pumps, compressors, or motors (e.g., topside or downhole) used to drive the wellbore servicing fluids into motion, any valves or related joints used to regulate the pressure or flow rate of the wellbore servicing fluids, and any sensors (i.e., pressure and temperature), gauges, and/or combinations thereof, and the like. The disclosed wellbore servicing fluids may also directly or indirectly affect the various downhole equipment and tools that may come into contact with the wellbore servicing fluids such as, but not limited to, wellbore casing, wellbore liner, completion string, insert strings, drill string, coiled tubing, slick line, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydro mechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Also disclosed herein is a method of servicing a wellbore penetrating at least a portion of a subterranean formation. The method can include: placing a solid-free fracturing fluid (e.g., a pad fluid) into the wellbore at an injection rate for generating a treating pressure above a fracture gradient to create one or more fractures in the subterranean formation. The solid-free fracturing fluid can include a scale inhibitor, a surfactant, a gelling agent, a crosslinker, and sea water, and wherein the gelling agent crosslinks with the crosslinker to form a crosslinked system including the scale inhibitor. In one or more aspects, the method further includes contacting the solid-free fracturing fluid with barium present in the subterranean formation (e.g., in formation water), and inhibiting formation of scales within the wellbore. In one or more aspects, the method further includes placing a mixture of the solid-free fracturing fluid and proppants into the wellbore to place at least one proppant into the one or more fractures. In one or more aspects, the method further includes flowing back to the surface at least a portion of the solid-free fracturing fluid placed into the wellbore, and producing hydrocarbons from the subterranean formation via the wellbore.

Various benefits may be realized by utilization of the presently disclosed methods and compositions. By incorporating the scale inhibitor and the surfactant into the wellbore servicing fluid as disclosed herein, scale formation and water blockage during and after a fracturing operation can be mitigated. Therefore, scale-related damages to equipment can be mitigated and hydrocarbon production rate can be increased.

EXAMPLES

The aspects having been generally described, the following examples are given as particular aspects of the disclosure and to demonstrate the practice and advantages thereof. It is understood that the examples are given by way of illustration and are not intended to limit the specification or the claims in any manner.

Example 1

A long-term barium inhibition performance experiment was conducted with various fluid samples, which were prepared by mixing different amounts of seawater fluid (SWF), a scale inhibitor (SI), and formation water (FW). The SWF and the FW were from a wellbore in the Gulf of Mexico. The FW included approximately 150-350 ppm of barium (Ba), which was expected to form barium precipitation on immediate contact with the SWF without the SI. Other species in the FW related to scaling included calcium at 2,000-3,500 ppm, magnesium at 600 ppm, bicarbonate at 120-180 ppm, and pH around 7.2. The testing matrix of the fluid samples included SWF with four loading rates of the scale inhibitor (0%-untreated, 0.2% or 2 gpt, 0.5% or 5 gpt, and 1% or 10 gpt), three brine mixing scenarios (with weight ratio of FW to SWF as 1:9, 5:5, and 9:1), four incubation time points (0, 1, 3, and 6 weeks from preparing the fluid samples), and at 230° F. Concentrations of Ba cations in solution of the fluid samples were measured at the four incubation time points.

Figure 3:
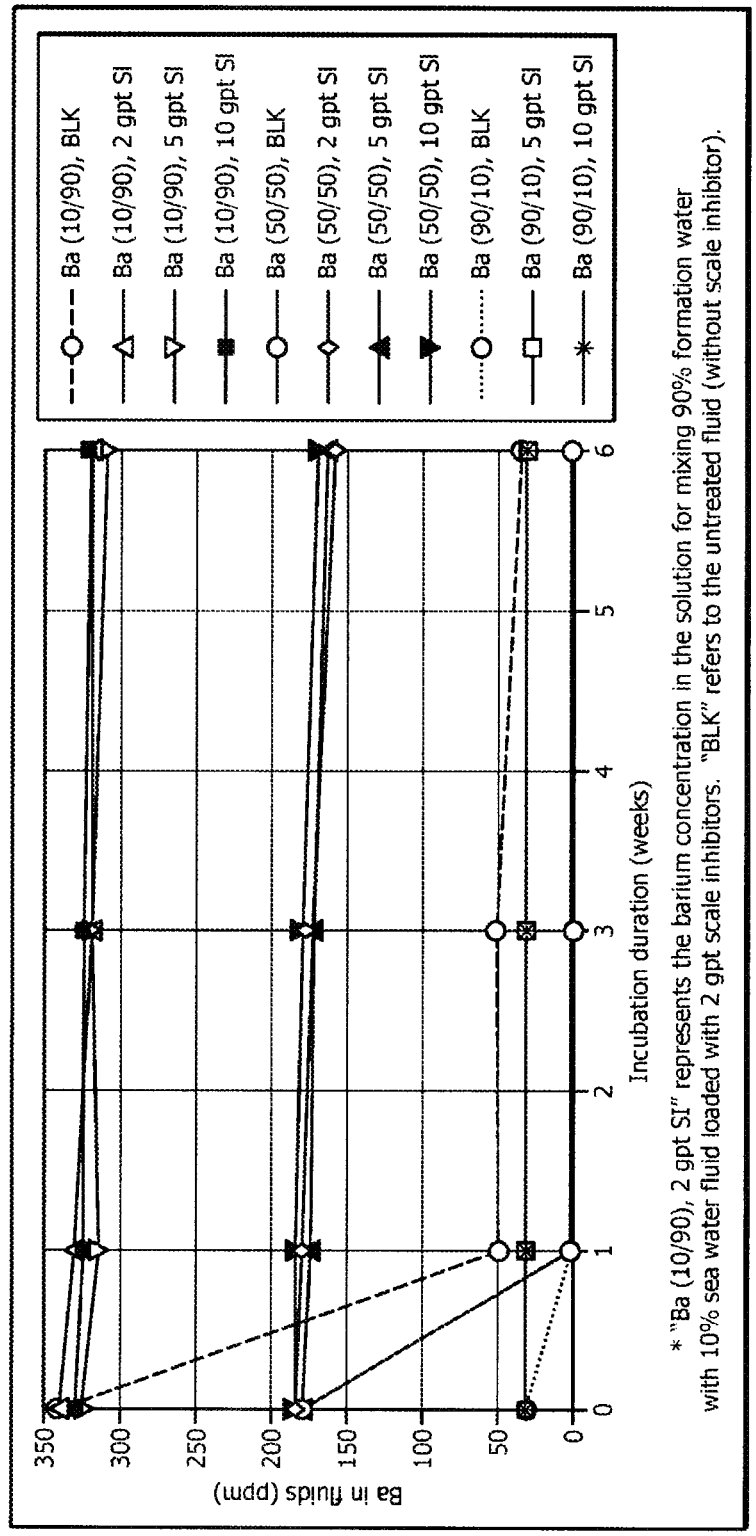
FIG. 3 is a graph of the concentrations of scaling cations for different mixing scenarios over 0 to 6 weeks duration in accordance with an experiment.

FIG. 3 shows a tracking of the scaling cations of Ba in solution of the fluid samples over a period of six weeks during the experiment. Without the scale inhibitor, barium residue in solution of the fluid samples dropped from the initial 340 ppm to about 50 ppm within one week and fell even further to about 30 ppm at six weeks from the beginning for the 10% SWF: 90% FW fluid sample; essentially all of the barium scaled out for the fluid samples with 50% SWF: 50% FW and 90% SWF: 10% FW. The fluid samples with the SI could maintain the barium concentration at higher levels compared to the fluid samples without the SI, which demonstrated that the SI could inhibit formation of the barium scale. For the fluid samples with the SI, greater than 90% of the barium initially in solution of the fluid samples were protected (e.g., maintained in the solution of the fluid samples) from precipitation through the six weeks, except one data point with a percentage of about 85%, which represented the scenario of 50% SWF: 50% FW with 0.2% SI loading rate at six weeks from the beginning.

Example 2

Sand pack oil displacement tests were performed with RockPerm™ column flow apparatus, available from Halliburton Energy Services, Inc. In each test, a sand pack was prepared with 2 grams (g) of 80-120 mesh formation cutting sample mixed with 8 g of 100 mesh SSA #2 sand. Synthetic formation water (FW #1) containing 7 wt. % KCl and 600 ppm Ba was prepared. Seawater based fracturing fluid was broken with a breaker and filtered to remove any gel residue. In the broken fracturing fluid (BFF), there is no any scale inhibitor and surfactant. Base fluids including filtered BFF and FW #1 at a mixing weight ratio of 50%:50% were prepared. Four columns A1, A2, B1, and B2 were packed with the sand pack and treated with four different fluids: base fluid, base fluid with an SI in an amount of 50 gallons per thousand gallons of liquid (gpt), base fluid with 1 gpt surfactant without SI, and base fluid with 1 gpt surfactant and 50 gpt SI, respectively. The four fluids were water-based fluids. Synthetic oil was then placed from the top of each column and allowed to flow through the sand pack. The time at which the synthetic oil broke through the column and the volume of water-based fluid being displaced out at the end of the test were recorded. Table 1 below shows the fluid matrix and the results of the sand pack oil displacement tests.

TABLE 1

Fluid matrix and results of sand pack oil displacement tests

| Base fluid | without SI | with SI |
|---|---|---|
| #1: without surfactant | column A-1 oil didn't break through for 24 h | column A-2 oil didn't break through for 24 h |
| #2: with surfactant | column B-1 oil breakthrough at 5.6 min with 3.1 mL of displacement volume | column B-2 oil breakthrough at 3.3 min with 3.4 mL of displacement volume |

Figure 4A:
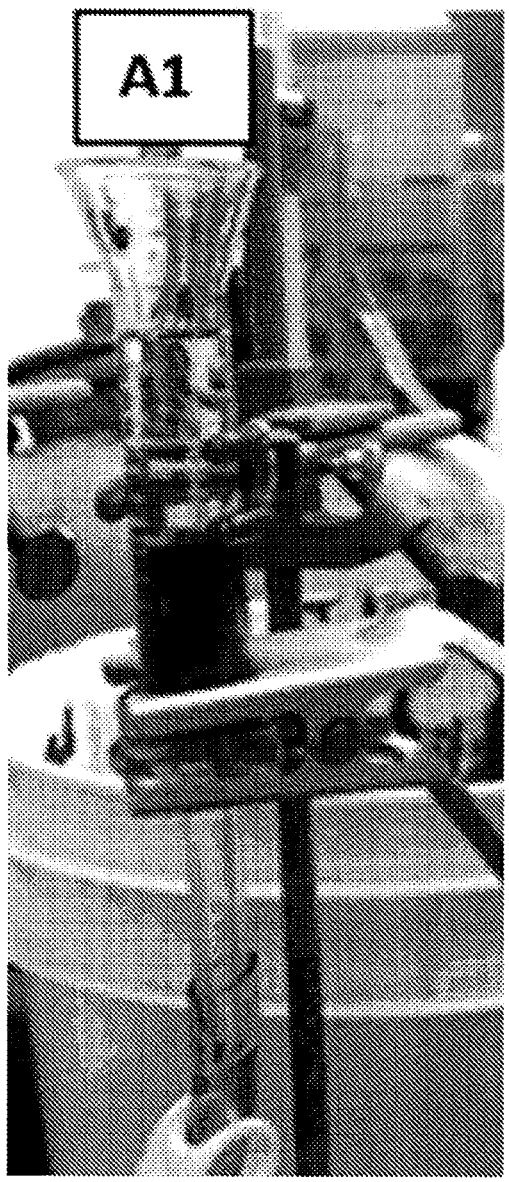
FIGS. 4A and 4B are photos of samples and apparatus before a sand pack oil displacement test in accordance with some aspects of the disclosure.
Figure 4B:
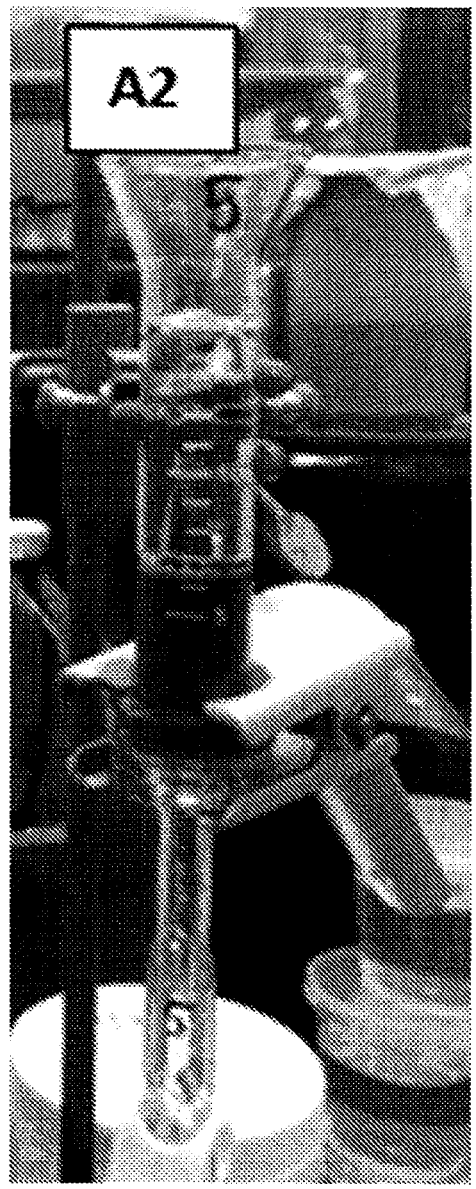

FIGS. 4A-4B show the synthetic oil placed in columns A1 and A2 before the test, respectively, and FIGS. 5A-5B show columns A1 and A2 after the test, respectively. After 24 hours, the synthetic oil did not break through columns A1 or A2, which were treated with the fluids without a surfactant. The results showed that without a surfactant, the fluids with or without SI may cause high surface tension for the fluids, therefore additional pressure may be required to have the oil flowthrough. This can bring risks to adversely impact hydrocarbon production from a wellbore treated by a wellbore servicing fluid.

Figure 6:
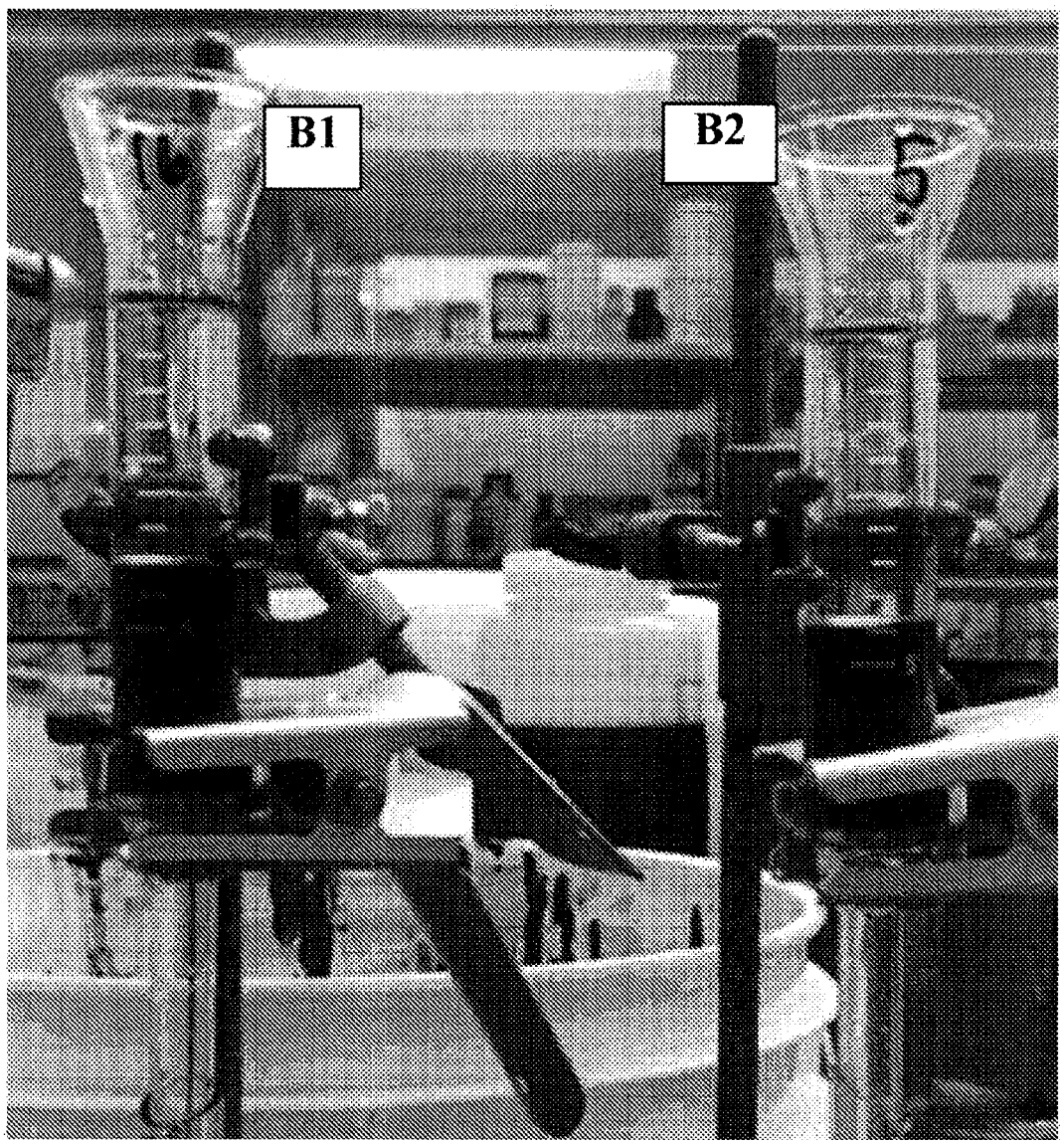
FIG. 6 is a photo of samples and apparatus before a sand pack oil displacement test in accordance with some aspects of the disclosure.
Figure 7A:
FIGS. 7A-7C are photos of samples and apparatus after a sand pack oil displacement test in accordance with some aspects of the disclosure.
Figure 7B:
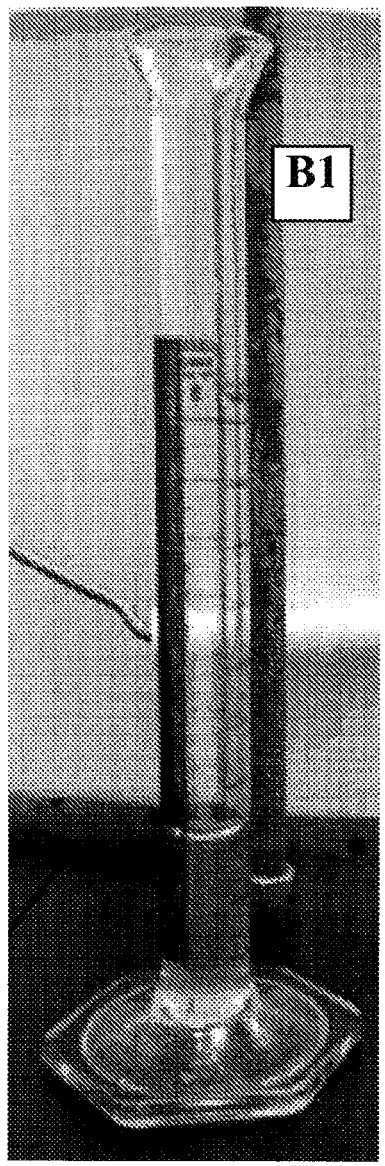
Figure 7C:
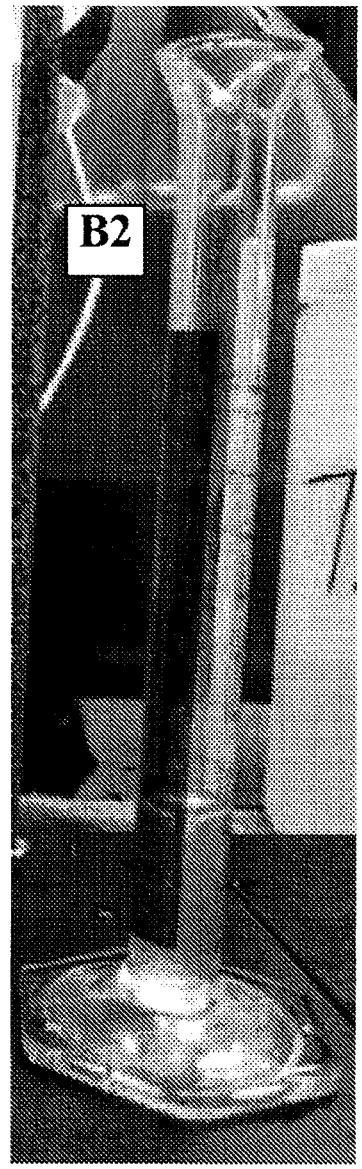

FIG. 6 shows the synthetic oil placed in columns B1 and B2 before the test. FIGS. 7A-7C show columns B1 and B2 and displaced fluids from columns B1 and B2 after the test, respectively. Table 2 below shows a summary of the results of the sand pack oil displacement tests. For columns B1 and B2, the synthetic oil could break through the sand pack quickly with aid of the surfactant. Column B2, which was treated with the fluid including SI and the surfactant, had a breakthrough time 41% less than that of column B1 and a fluid displacement volume 10% greater than that of column B1. Thus, the results demonstrated synergistic effects for a combination of SI and a surfactant as flowback acids.

TABLE 2

Summary of the sand pack oil displacement test results

| | Breakthrough (BT) time (min) | Fluid displacement volume (mL) |
|---|---|---|
| Column #A-1 Base fluid, no SI, no surfactant | No BT | <0.5 |
| Column #A-2 Base fluid, 50 gpt SI, no surfactant | No BT | <0.5 |
| Column #B-1 Base fluid, no SI, 1 gpt surfactant | 5.6 | 3.1 |
| Column #B-2 Base fluid, 50 gpt SI, 1 gpt surfactant | 3.3 | 3.4 |
| Quantitative Improvement due to synergetic effects of SI & surfactant | 41% | 10% |

Example 3

Shear recovery experiments were conducted for two samples with a crosslinked base fluid with and without SI, and the results are listed in Table 3 below. The crosslinked base fluid included the same compositions as a wellbore servicing fluid disclosed herein except the SI. The sample with the crosslinked base fluid and SI was a wellbore servicing fluid disclosed herein. Changes in viscosity over time was monitored after the samples had been exposed to a high shear rate (e.g., 850 sec$^{-1}$, 880 sec$^{-1}$). The shear recovery data showed that when compared with the sample without SI, the sample with SI had a higher viscosity at the same corresponding time, thus had a better proppant carrying capacity under change of shear rate. Accordingly, a wellbore servicing fluid having similar composition as the sample with SI (i.e., a wellbore servicing fluid of the type disclosed herein) would have less chance to cause proppant accumulation and/or blockage (e.g., in fracturing equipment) in a scenario that the flow of the wellbore servicing fluid unexpectedly stops during pumping and then resumes.

The shear recovery data also showed possibility for the wellbore servicing fluid to include less amount of the gelling agent to obtain a proper viscosity, which may control fluid loss to the formation.

TABLE 3

Fluid performance after exposure to high shear

| Shear Recovery | Crosslinked base fluid with 50 gpt SI | Crosslinked base fluid without SI |
|---|---|---|
| Viscosity at 30 sec. (cP) | 375 | 211 |
| Viscosity at 120 sec. (cP) | 983 | 726 |
| Time (sec.) when viscosity at 150 cP | 5 | 16 |
| Time (sec.) when viscosity at 300 cP | 26 | 43 |

ADDITIONAL DISCLOSURE

The following is provided as additional disclosure for combinations of features and embodiments of the present disclosure.

A first embodiment, which is a wellbore servicing fluid comprising: a scale inhibitor, a surfactant, and an aqueous fluid comprising sulfate in an amount of from about 100 ppm to about 10,000 ppm based on the total weight of the aqueous fluid.

A second embodiment, which is the wellbore servicing fluid of the first embodiment, wherein the scale inhibitor comprises a polymeric scale inhibitor, phosphate esters, phosphonates, bis(hexamethylene triamine penta (methylene phosphonic acid)), diethylene triamine penta (methylene phosphonic acid), ethylene diamine tetra (methylene phosphonic acid), hexamethylenediamine tetra(methylene phosphonic acid), 1-hydroxy ethylidene-1,1-diphosphonic acid, 2-hydroxyphosphonocarboxylic acid, 2-phosphonobutane-1,2,4-tricarboxylic acid, phosphino carboxylic acid, diglycol amine phosphonate, aminotris(methanephosphonic acid), methylene phosphonates, phosphonic acids, aminoalkylene phosphonic acids, aminoalkyl phosphonic acids, or combinations thereof.

A third embodiment, which is the wellbore servicing fluid of the second embodiment, wherein the polymeric scale inhibitor comprises polyphosphates and salts thereof; polyvinyl sulfonates; polyacrylamidomethylpropane sulfonic acid; carboxymethyl inulin; other carboxylic acid containing polymers; sulfonated acrylate polymers or copolymers; acrylic acid polymers or copolymers, and salts thereof; sulfonated acrylic acid polymers or copolymers, and salts thereof; or combinations thereof.

A fourth embodiment, which is the wellbore servicing fluid of any of the second through the third embodiments, wherein the polymeric scale inhibitor comprises a sulfonated polyacrylate copolymer.

A fifth embodiment, which is the wellbore servicing fluid of any of the second through the fourth embodiments, wherein the polymeric scale inhibitor has a number average molecular weight from about 500 Daltons (Da) to about 100,000 Da.

A sixth embodiment, which is the wellbore servicing fluid of any of the first through the fifth embodiments, wherein the scale inhibitor is present in the wellbore servicing fluid in an amount of from about 0.05 gallon per thousand gallons (gpt) to about 200 gpt, based on the total volume of the wellbore servicing fluid.

A seventh embodiment, which is the wellbore servicing fluid of any of the first through the sixth embodiments, wherein the surfactant comprises a cationic surfactant, an anionic surfactant, an amphoteric surfactant, a zwitterionic surfactant, a non-ionic surfactant, or combinations thereof.

An eighth embodiment, which is the wellbore servicing fluid of the seventh embodiment, wherein the cationic surfactant comprises quaternary ammonium salt, ethoxylated quaternary ammonium salts, amine oxides, or combinations thereof.

A ninth embodiment, which is the wellbore servicing fluid of the seventh or the eighth embodiment, wherein the cationic surfactant comprises stearyltrimethylammonium chloride, cetyltrimethylammonium tosylate, octyltrimethylammonium chloride, erucyl bis-(hydroxyethyl)methylammonium chloride, erucyl trimethylammonium chloride cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, or combinations thereof.

A tenth embodiment, which is the wellbore servicing fluid of any of the seventh through the ninth embodiments, wherein the anionic surfactant comprises alkali salts of acids, alkali salts of fatty acids, alkaline salts of acids, sodium salts of acid, sodium salts of fatty acid, alkyl sulphates, alkyl ethoxylate, sulphates, sulfonates, soaps, or combinations thereof.

An eleventh embodiment, which is the wellbore servicing fluid of any of the seventh through the tenth embodiments, wherein the anionic surfactant comprises sodium oleate, sodium dodecylbenzenesulfonate, sodium decanoate, sodium octyl sulfate, sodium caprylate, sodium stearate, sodium myristate, sodium laurate, sodium cetyl sulfate, sodium myristyl sulfate, sodium lauryl sulfate, sodium decyl sulfate, or combinations thereof.

A twelfth embodiment, which is the wellbore servicing fluid of any of the seventh through the eleventh embodiments, wherein the zwitterionic surfactant comprises alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, or combinations thereof.

A thirteenth embodiment, which is the wellbore servicing fluid of any of the first through the twelfth embodiments, wherein the surfactant is present in the wellbore servicing fluid in an amount of from about 0.01 gpt to about 10 gpt, based on the total volume of the wellbore servicing fluid.

A fourteenth embodiment, which is the wellbore servicing fluid of any of the first through the thirteenth embodiments, wherein the aqueous fluid comprises fresh water, surface water, ground water, salt water, brine, sea water, produced water, or combinations thereof.

A fifteenth embodiment, which is the wellbore servicing fluid of any of the first through the fourteenth embodiments, wherein the aqueous fluid comprises sea water.

A sixteenth embodiment, which is the wellbore servicing fluid of any of the first through the fifteenth embodiments, wherein the aqueous fluid is present in the wellbore servicing fluid in an amount of from about 5 wt. % to about 99 wt. % based on the total weight of the wellbore servicing fluid.

A seventeenth embodiment, which is the wellbore servicing fluid of any of the first through the sixteenth embodiments, further comprising a gelling agent.

An eighteenth embodiment, which is the wellbore servicing fluid of the seventeenth embodiment, wherein the gelling agent comprises locust bean gum, Karaya gum, gum tragacanth, hydrophobically modified guars, high-molecular weight polysaccharides composed of mannose and galactose sugars, heteropolysaccharides obtained by the fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, or combinations thereof.

A nineteenth embodiment, which is the wellbore servicing fluid of any of the seventeenth through the eighteenth embodiments, wherein the gelling agent has a molecular weight in a range of from about 1.2 MM Daltons (Da) to about 5 MM Da.

A twentieth embodiment, which is the wellbore servicing fluid of any of the seventeenth through the nineteenth embodiments, wherein the gelling agent is in the wellbore servicing fluid in an amount of from about 0.001 wt. % to about 3 wt. %, based on the total weight of the wellbore servicing fluid.

A twenty-first embodiment, which is the wellbore servicing fluid of any of the seventeenth through the twentieth embodiments, further comprising a crosslinker.

A twenty-second embodiment, which is the wellbore servicing fluid of the twenty-first embodiment, wherein the crosslinker comprises a boron containing compound.

A twenty-third embodiment, which is the wellbore servicing fluid of the twenty-first or the twenty-second embodiment, wherein the crosslinker comprises a boric acid, boric oxide, pyroboric acid, metaboric acid, borax, sodium tetraborate and like, or combinations thereof.

A twenty-fourth embodiment, which is the wellbore servicing fluid of any of the twenty-first through the twenty-third embodiments, wherein the crosslinker is in the wellbore servicing fluid in an amount of from about 0 gpt to about 20 gpt, based on the total volume of the wellbore servicing fluid.

A twenty-fifth embodiment, which is the wellbore servicing fluid of any of the twenty-first through the twenty-fourth embodiments, wherein the gelling agent crosslinks with the crosslinker to form a crosslinked system.

A twenty-sixth embodiment, which is the wellbore servicing fluid of the twenty-fifth embodiment, wherein the crosslinked system further comprises the scale inhibitor.

A twenty-seventh embodiment, which is the wellbore servicing fluid of any of the first through the twenty-sixth embodiments, further comprising proppants.

A twenty-eighth embodiment, which is the wellbore servicing fluid of the twenty-seventh embodiment, wherein the proppants comprise sand, bauxite, ceramic materials, glass materials, polymer materials, polytetrafluoroethylene materials, nutshell pieces, cured resinous particulates including nutshell pieces, seed shell pieces, cured resinous particulates including seed shell pieces, fruit pit pieces, cured resinous particulates including fruit pit pieces, wood, composite particulates, or combinations thereof.

A twenty-ninth embodiment, which is the wellbore servicing fluid of the twenty-seventh or the twenty-eighth embodiment, wherein the proppants are present in the wellbore servicing fluid in an amount of from about 0 pounds per gallon (lb/gal) to about 20 lb/gal, based on the total weight of the wellbore servicing fluid.

A thirtieth embodiment, which is the wellbore servicing fluid of any of the first through the twenty-ninth embodiments, further comprising one or more additives.

A thirty-first embodiment, which is the wellbore servicing fluid of the thirtieth embodiment, wherein the one or more additives comprise a friction reducer, a strength-stabilizing agent, an emulsifier, an expansion agent, a salt, a fluid loss agent, a vitrified shale, a thixotropic agent, a dispersing agent, a weight reducing additive, a heavyweight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives, inert particulates, a biopolymer, a polymer, a fume silica, a free fluid control additive, particulate materials, viscosifiers, acids, bases, mutual solvents, corrosion inhibitors, conventional breaking agents, relative permeability modifiers, lime, weight-reducing agents, clay control agents, fluid loss control additives, flocculants, water softeners, foaming agents, oxidation inhibitors, thinners, scavengers, gas scavengers, lubricants, bridging agents, a foam stabilizer, catalysts, dispersants, breakers, emulsion thinner, emulsion thickener, pH control additive, lost circulation additives, buffers, stabilizers, chelating agents, oxidizers, a clay, reducers, consolidating agent, complexing agent, sequestration agent, control agent, an oxidative breaker, and the like, or combinations thereof.

A thirty-second embodiment, which is the wellbore servicing fluid of the thirtieth or the thirty-first embodiment, wherein the one or more additives are present in the wellbore servicing fluid in an amount of from about 0.01 wt. % to about 80 wt. % based on the total weight of the wellbore servicing fluid.

A thirty-third embodiment, which is the wellbore servicing fluid of any of the first through the thirty-second embodiments, having a viscosity of from about 1 cP to about 7,500 cP at about 40 s$^{-1}$ and about 34° F. to about 450° F.

A thirty-fourth embodiment, which is the wellbore servicing fluid of any of the first through the thirty-third embodiments, having a density of from about 5 lb/gal to about 20 lb/gal.

A thirty-fifth embodiment, which is the wellbore servicing fluid of any of the first through the thirty-fourth embodiments, having an oil breakthrough time of equal to or less than about 120 min in a sand pack oil displacement test.

A thirty-sixth embodiment, which is the wellbore servicing fluid of any of the first through the thirty-fifth embodiments, having a displacement volume of from about 0.5 mL to about 10 mL in a sand pack oil displacement test.

A thirty-seventh embodiment, which is the wellbore servicing fluid of any of the first through the thirty-sixth embodiments, being a fracturing fluid.

A thirty-eighth embodiment, which is a method of preparing a wellbore servicing fluid, comprising: mixing components of the wellbore servicing fluid using mixing equipment to form a pumpable slurry, wherein the wellbore servicing fluid comprises a scale inhibitor, a surfactant, and an aqueous fluid comprising sulfate in an amount of from about 100 ppm to about 10,000 ppm based on the total weight of the aqueous fluid.

A thirty-ninth embodiment, which is the method of the thirty-eighth embodiment, further comprising placing the wellbore servicing fluid in a wellbore penetrating at least a portion of a subterranean formation, wherein the wellbore servicing fluid contacts barium present in the subterranean formation.

A fortieth embodiment, which is a method of servicing a wellbore penetrating at least a portion of a subterranean formation, comprising: placing a wellbore servicing fluid into a wellbore, wherein the wellbore servicing fluid comprises a scale inhibitor, a surfactant, and an aqueous fluid comprising sulfate in an amount of from about 100 ppm to about 10,000 ppm based on the total weight of the aqueous fluid.

A forty-first embodiment, which is the method of fortieth embodiment, further comprising contacting the wellbore servicing fluid with barium present in the subterranean formation.

A forty-second embodiment, which is the method of any of the fortieth through the forty-first embodiments, further comprising inhibiting formation of scales within the wellbore.

A forty-third embodiment, which is the method of any of the fortieth through the forty-second embodiments, wherein placing the wellbore servicing fluid into the wellbore is at or above a pressure sufficient to create or enhance at least one fracture in the subterranean formation.

A forty-fourth embodiment, which is the method of the forty-third embodiment, further comprising depositing at least one proppant in the at least one fracture.

A forty-fifth embodiment, which is the method of any of the fortieth through the forty-fourth embodiments, further comprising flowing back at least a portion of the wellbore servicing fluid to a surface of the wellbore.

A forty-sixth embodiment, which is the method of any of the fortieth through the forty-fifth embodiments, further comprising producing hydrocarbons from the subterranean formation via the wellbore.

A forty-seventh embodiment, which is the method of any of the fortieth through the forty-sixth embodiments, wherein the wellbore has a Bottomhole Static Temperature (BHST) of from about 50° F. to about 450° F.

A forty-eighth embodiment, which is the method of any of the fortieth through the forty-seventh embodiments, wherein the wellbore is offshore and the aqueous fluid comprises sea water.

A forty-ninth embodiment, which is a method of servicing an offshore wellbore penetrating at least a portion of a subterranean formation, comprising: placing a solid-free fracturing fluid into the wellbore at an injection rate for generating a treating pressure above a fracture gradient to create one or more fractures in the subterranean formation, wherein the solid-free fracturing fluid comprises a scale inhibitor, a surfactant, a gelling agent, a crosslinker, and sea water, and wherein the gelling agent crosslinks with the crosslinker to form a crosslinked system including the scale inhibitor; contacting the solid-free fracturing fluid with barium present in the subterranean formation; inhibiting formation of scales within the wellbore; and placing a mixture of the solid-free fracturing fluid and proppants into the wellbore to place at least one proppant into the one or more fractures.

A fiftieth embodiment, which is the method of the forty-ninth embodiment, further comprising flowing back to the surface at least a portion of the solid-free fracturing fluid placed into the wellbore, and producing hydrocarbons from the subterranean formation via the wellbore.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of servicing a wellbore penetrating at least a portion of a subterranean formation, comprising: placing a wellbore servicing fluid into a wellbore, wherein the wellbore servicing fluid is a solids-free wellbore servicing fluid that comprises a scale inhibitor in an amount of about 0.05 gpt to about 200 gpt, a surfactant in an amount of about 0.01 gpt to about 10 gpt, and an aqueous fluid comprising sulfate in an amount of from about 100 ppm to about 10,000 ppm based on the total weight of the aqueous fluid, wherein the wellbore servicing fluid has an oil breakthrough time of equal to or less than about 120 min in a sand pack oil displacement test and the wellbore servicing fluid has a displacement volume of from about 0.5 mL to about 10 mL in a sand pack oil displacement test.

2. The method of claim 1, further comprising contacting the wellbore servicing fluid with barium present in the subterranean formation.

3. The method of claim 1, further comprising inhibiting formation of scales within the wellbore.

4. The method of claim 1, further comprising flowing back at least a portion of the wellbore servicing fluid to a surface of the wellbore.

5. The method of claim 1, further comprising producing hydrocarbons from the subterranean formation via the wellbore.

6. The method of claim 1, wherein the scale inhibitor comprises a polymeric scale inhibitor, phosphate esters, phosphonates, bis(hexamethylene triamine penta (methylene phosphonic acid)), diethylene triamine penta (methylene phosphonic acid), ethylene diamine tetra (methylene phosphonic acid), hexamethylenediamine tetra(methylene phosphonic acid), 1-hydroxy ethylidene-1,1-diphosphonic acid, 2-hydroxyphosphonocarboxylic acid, 2-phosphonobutane-1,2,4-tricarboxylic acid, phosphino carboxylic acid, diglycol amine phosphonate, aminotris(methanephosphonic acid), methylene phosphonates, phosphonic acids, aminoalkylene phosphonic acids, aminoalkyl phosphonic acids, or combinations thereof.

7. The method of claim 1, wherein the scale inhibitor comprises a polymeric scale inhibitor, wherein the polymeric scale inhibitor comprises polyphosphates and salts thereof; polyvinyl sulfonates; polyacrylamidomethylpropane sulfonic acid; carboxymethyl inulin; other carboxylic acid containing polymers; sulfonated acrylate polymers or copolymers; acrylic acid polymers or copolymers, and salts thereof; sulfonated acrylic acid polymers or copolymers, and salts thereof; or combinations thereof.

8. The method of claim 1, wherein the scale inhibitor comprises a polymeric scale inhibitor, wherein the polymeric scale inhibitor comprises a sulfonated polyacrylate copolymer.

9. The method of claim 1, wherein the surfactant comprises a cationic surfactant, an anionic surfactant, an amphoteric surfactant, a zwitterionic surfactant, a non-ionic surfactant, or combinations thereof.

10. The method of claim 1, wherein the wellbore servicing fluid further comprises a gelling agent.

11. The method of claim 10, wherein the wellbore servicing fluid further comprises a crosslinker.

12. The method of claim 11, wherein the crosslinker comprises a boron containing compound.

13. The method of claim 11, wherein the crosslinker comprises a boric acid, boric oxide, pyroboric acid, metaboric acid, borax, sodium tetraborate and like, or combinations thereof.

14. The method of claim 8, wherein the gelling agent crosslinks with the crosslinker to form a crosslinked system.

15. The method of claim 14, wherein the crosslinked system further comprises the scale inhibitor.

16. The method of claim 15, wherein the scale inhibitor comprises a polymeric scale inhibitor, wherein the polymeric scale inhibitor comprises a sulfonated polyacrylate copolymer.

17. The method of claim 1, further comprising placing another wellbore servicing fluid into the wellbore, wherein the another wellbore servicing fluid comprises the solids-free wellbore servicing fluid and a proppant.

18. The method of claim 1, wherein the scale inhibitor is in an amount of about 5 gpt to about 160 gpt, and the surfactant is in an amount of about 0.1 gpt to about 8 gpt.

19. The method of claim 1, wherein the scale inhibitor is in an amount of about 50 gpt, and the surfactant is in an amount of about 1 gpt.

20. The method of claim 1, wherein the wellbore servicing fluid is a fracturing fluid.

* * * * *